(12) United States Patent
Yeung (10) Patent No.: US 6,776,498 B2
(45) Date of Patent: Aug. 17, 2004

(54) FOOTWEAR WITH SPEED THRESHOLD INDICATIVE LUMINOUS SIGNAL GENERATOR AND CIRCUITRY THEREFOR

(76) Inventor: Kwok Piu Yeung, Room 2905, Ching On House, Tsz On Estate, Tsz Wan Shan, Kowloon (HK)

( * ) Notice: Subject to any disclaimer, the term of this patent is extended or adjusted under 35 U.S.C. 154(b) by 29 days.

(21) Appl. No.: 10/156,825

(22) Filed: May 30, 2002

(65) Prior Publication Data

US 2003/0223223 A1 Dec. 4, 2003

(51) Int. Cl.[7] ............................................. F21V 21/08
(52) U.S. Cl. .................. 362/103; 362/276; 362/802; 36/137
(58) Field of Search ................... 362/276, 802, 362/103, 464, 465, 200, 394; 36/137

(56) References Cited

U.S. PATENT DOCUMENTS

| | | | |
|---|---|---|---|
| 4,158,922 A | 6/1979 | Dana, III | |
| 4,253,253 A | 3/1981 | McCormick | |
| 4,723,215 A * | 2/1988 | Hibino et al. | 701/123 |
| 4,800,377 A * | 1/1989 | Slade | 340/466 |
| 4,848,009 A | 7/1989 | Rodgers | |
| 5,285,586 A | 2/1994 | Goldston et al. | |
| 5,408,764 A | 4/1995 | Wut | |
| 5,438,488 A | 8/1995 | Dion | |
| 5,457,900 A | 10/1995 | Roy | |
| 5,483,759 A | 1/1996 | Silverman | |
| 5,644,858 A | 7/1997 | Bemis | |
| 5,709,464 A | 1/1998 | Tseng | |
| 5,839,814 A * | 11/1998 | Roberts | 362/545 |
| 5,903,103 A | 5/1999 | Garner | |
| 5,909,088 A | 6/1999 | Wut | |
| 6,280,045 B1 | 8/2001 | Anteby et al. | |

* cited by examiner

Primary Examiner—Thomas M. Sember
(74) Attorney, Agent, or Firm—Burns, Doane, Swecker & Mathis, L.L.P.

(57) ABSTRACT

Footwear or foot-driven articles with speed threshold indicative luminous signal generator in which luminous signals are emitted when the motion speed of the footwear or the foot-driven article has reached a pre-determined threshold. The luminous signals above the threshold can be varied according to the speed above that threshold in a pre-determined manner.

12 Claims, 6 Drawing Sheets

FOOTWEAR WITH SPEED THRESHOLD INDICATIVE LUMINOUS SIGNAL GENERATOR AND CIRCUITRY THEREFOR

FIELD OF THE INVENTION

This invention relates to footwear, such as shoes, and foot-driven toys, such as skate-boards, roller-skates and more particularly, to footwear and foot-driven toys with a luminous signal generator.

BACKGROUND OF THE INVENITON

Footwear with built-in luminous signal generators are well known. In its simplest form, for example, as described in U.S. Pat. No. 4,253,253 to McCormick, a shoe is provided with a battery powered light source placed with a transparent compartment of a heel for ornamental purposes. The luminous signals can be generated by light sources such as incandescent bulbs, electro-luminescent panels and light emitting diodes (LEDs). The light is turned ON or OFF by a switch with an actuator located outside the heel.

Many different types of switches, for example, pressure switches, mercury switches and spring switches, have been used to control the light sources of footwear. For example, in U.S. Pat. No. 4,848,009, a mercury switch in which a ball of mercury runs back and forth along a tube between a pair of electrical contacts which turn on or off a circuit connection as a result of the motion of the footwear is disclosed. In U.S. Pat. No. 5,285,586, a pressure responsive switch which is operated by the application of the weight of the wearer of the footwear is described. In U.S. Pat. Nos. 5,408,764 and 5,909,088, a spring switch including a cantilevered coil spring which oscillates up and down to make and break contact with an electrical terminal is described.

To provide a more attractive and eye-catching display, footwear have been provided with intermittently flashing lights. For example, as described in U.S. Pat. No. 4,158,922, flashing of light in the order of a few Hertz is provided electronically by use of an oscillator or a flasher. To make the flashing light more interesting, an integrated circuit for generating a flashing light sequence when the switch is triggered is described in U.S. Pat. No. 5,903,103.

In U.S. Pat. No. 5,457,900, footwear including a plurality of lights which are selectively illuminated according to a predetermined patent of illumination in response to a velocity measurement is described. In this arrangement, once the system begins to operate, it steps through a series of illumination patterns in which the pattern changes in response to the passage of time without regard to any changes in the motion of the shoe or its wearers.

In U.S. Pat. No. 6,280,045, a delay circuit is provided for generating a random, unpredictable time delay where the motion-responsive switch has been closed. A flashing circuit on the footwear is then operative for flashing the light sources after the random time delay has elapsed.

U.S. Pat. No. 5,438,488 describes footwear with sequential illumination of LEDs. In this teaching, six LEDs are distributed along a plastic strip and each of the LEDs is turned ON in sequence so as to give the appearance of a travelling light along the strip when the LEDs are successively turned ON.

It will be apparent from a review of the above-mentioned prior art teachings that the various forms of light generation, whether static, random or sequential, light generation are solely concerned with providing enhanced visual attractiveness or visual stimulation.

Hence, it will be highly beneficial if features of utilitarian nature can be provided with lighted footwear. Of course, it will be even more desirable if such utilitarian features can be provided while maintaining the visual attractiveness or visual stimulation provided by lighting systems of conventional lighted footwear.

In many walking, jogging or running occasions, it is sometimes desirable to maintain the speed so that it does not exceed a certain maximum limit. For example, a speed limit may be desirable to maintain the heart rate below a certain maximum limit or to maintain a steady running pace for long distance training.

In some occasions, on the other hand, it may be desirable to maintain the speed so that it does not drop below a certain minimum. For example, when it is desirable to maintain a certain speed to complete a certain distance within a certain time limit or to maintain a desirable heart beat to achieve desirable cardio-vascular exercise conditions.

Hence, it will be highly desirable if visible information relating to the instantaneous speed of the wearer can be provided by such lighted footwear. Preferably, such speed related information can be provided without requiring unduly complicated circuitry or circuit arrangements which are bulky and expensive.

Furthermore, it will also be highly desirable if such speed related signals can be observed by the wearer himself/herself or other people. The speed related information will be useful to the wearer so that the wearer will be instantly informed once a certain specified speed limit has been reached. Likewise, the speed related information will also provide information and incentive to other competitors in a race to promote the overall competitiveness and will be useful for a trainer to monitor the instantaneous performance of the wearer.

OBJECT OF THE INVENTION

Accordingly, it is an object of the present invention to provide lighted footwear (including foot-driven toys) and circuit arrangements therefor in which the generated luminous signals carry with them features of utilitarian nature. In the following specification, the term "footwear" collectively means footwear, foot-driven toys or articles and the like unless the context requires otherwise.

In one aspect, it is an object of the present invention to provide lighted footwear or foot-driven toys or articles in which the luminous signals generated by the footwear or the foot-driven toys carry information relating to the motion speed of the wearer.

Thus, it is an object of the present invention to provide lighted footwear and circuit arrangements therefor in which the luminous signal output will be generated upon reaching a certain pre-determined threshold speed. Preferably, the luminous signal output produced by the lighted footwear once a prescribed threshold speed has been reached will be further indicative of the speed above that threshold speed.

As a minimum, it is an object of the present invention to provide the public with a useful choice of lighted footwear and circuit arrangements therefor.

SUMMARY OF THE INVENTION

According to the present invention, there is provided a luminous circuit arrangement for footwear and foot-driven articles and toys such as skate-boards, roller-skates and the like, including:— a motion actuated contact switch,
a speed threshold detecting means, a luminous signal generating means, wherein
said speed threshold detection means includes means to compare the switching speed of said contact switch with a pre-determined speed,
said threshold detection means provides a signal to said luminous signal generating means when the switching speed of said contact switch reaches said pre-determined speed.

Preferably, said speed threshold detection means includes timing and decision circuitry for determining whether the operating speed of said motion actuated speed has reached said pre-determined speed by comparing the contact duration time of said contact switch during circuit closing with a pre-set time.

Preferably, said pre-set time being equivalent to the switch closing time duration in each switch operation cycle corresponding to the switch closing duration at said predetermined threshold speed.

Preferably, said timing circuitry includes a resistor capacitor (R-C) pair having a time constant approximately equal to said pre-set time.

Preferably, said timing circuitry includes a resistor (R) and a capacitor (C) such that the time constant ($\tau$=RC) is approximately equal to the contact time per operation cycle of said motion actuated contact switch corresponding to said pre-determined speed.

Preferably, said operating speed of said contact switch is determined by monitoring the contact duration time during each switch closing cycle.

Preferably, said motion actuated contact switch includes a cantilevered spring actuation member having a springable free end which closes or opens said switch connection respectively by contacting with or disengaging from a switch terminal of said switch, said contact duration time between said spring end and said switch terminal being inversely proportional to said speed of operation of said contact switch.

Preferably, said luminous signal generating means further includes a flashing frequency controller in which the flashing frequency output is variable by the resistance valve at the input of said controller, said resistance being variable by said contact duration of said contact switch.

According to a second aspect of the present invention, there is provided footwear including the afore-mentioned circuit arrangements.

Preferably, said footwear includes a luminous signal display visible at the front of said footwear.

BRIEF DESCRIPTION OF THE DRAWINGS

A preferred embodiment of the present invention will now be explained in further detail by way of example and with reference to the accompanying drawings, in which:—

DETAILED DESCRIPTION OF THE PREFERRED EMBODIMENTS

Figure 1:
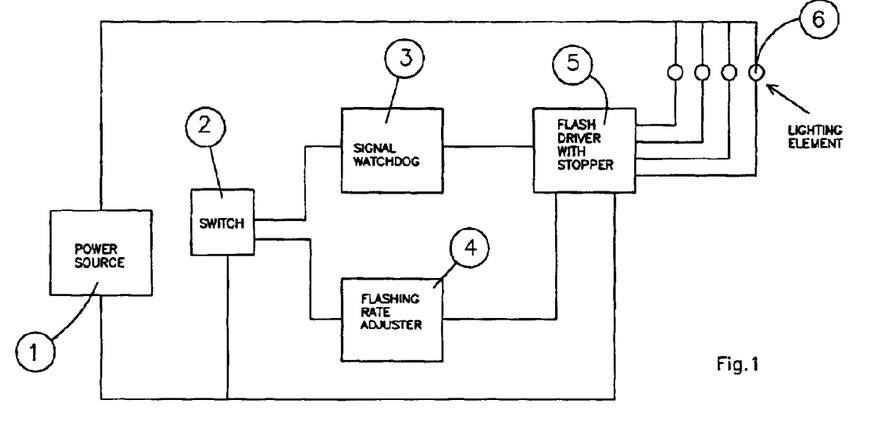
FIG. 1 is a schematic block diagram showing the major constituting blocks of a preferred embodiment of the present invention.

Referring firstly to the schematic block diagram shown in FIG. 1, the speed threshold indicative luminous signal output circuit arrangement of a first preferred embodiment of the present invention includes a power source 1, a motion activated switch 2, a signal watchdog (or a speed threshold detection means 3), a flash driver (or a luminous signal generator) 5 and a plurality of lighting elements 6. In addition, a flashing rate adjustor 4 is connected between the motion activated switch and the luminous signal generator 5.

The power source 1 provides the necessary operating power of the luminous circuitry as well as the power required for the lighting elements. The lighting elements can be, for example, incandescent bulbs, electro-luminescent panels, LEDs or the like. The motion activated switch can be any appropriate switches having an operating frequency which correlate to the speed of motion of the switch in a certain prescribed manner. In the present preferred embodiments, the motion activated switch includes a cantilevered spring actuation member which closes the circuit connection when the springable free end of the cantilevered spring is in contact with the switch terminal not already in contact with the conductive spring.

A signal watchdog or a speed threshold detecting circuitry is connected to the switch. This signal watchdog 3 monitors the operating speed of the motion actuated switch, for example, by monitoring the frequency or duration of opening and closing of the switch, and sends an actuation signal to the flash signal driver to operate the lighting elements 6 when the appropriate timing conditions are met. Various speed threshold detection circuitry or algorithm which are known to persons skilled in the art can be utilized. In the present preferred embodiments, the switch operating speed threshold is detected by comparing the contact closing and opening duration of the cantilevered spring contact with a predetermined time corresponding to a pre-determined speed. The signal watchdog 3 will then compare and decide whether the contact or open time of the switch is longer than the pre-set time in which case the speed is below the threshold speed or whether the contact time is shorter than the pre-set time in which case the speed is above the threshold speed and then sending out corresponding instruction commands to the flash signal driver 5 to output the desirable luminous signals, whether intermittent, sequence or patterns of light. To provide further correlation between the luminous signal frequency with the speed deferential from the threshold speed, a flashing rate adjustor with means to adjust the flashing frequency of the luminous signal generated by the flashing driver is connected between the contact switch 2 and the flashing driver 5. This flashing rate adjustor 4 includes means which can translate the switch operating frequency into a control parameter to be recognized by the flashing signal driver 5 to alter the signal frequency or patterns generated by the flashing signal driver according to the speed differential.

Figure 2:
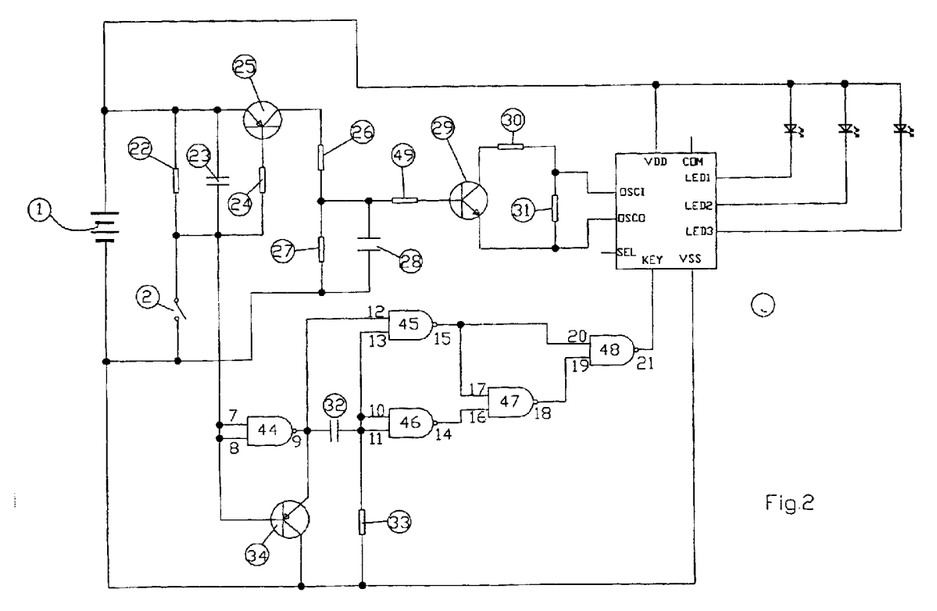
FIG. 2 is a schematic circuit diagram showing a preferred example of circuit arrangements for implementing the schematic block diagram of FIG. 1.

Referring to FIG. 2 which shows a preferred example of circuit arrangements of the luminous signal output circuitry, the circuit arrangements include a power source 1, a switch 2, an integrated circuit flashing signal driver or luminous signal generator 5 plus a timing and decision circuitry 3 and 4 for performing the functions of a signal watchdog and threshold speed detection. The motion actuated contact switch 2 can be a switch with a cantilevered spring actuation member, a switch with a metal ball actuator or a switch with a metal rod actuator. One terminal of the switch is simultaneously connected to the base of a bipolar transistor 25 via a base resistor 24 and to the collector of the transistor 25 through a resistor 22 and a capacitor 23 pair which are connected in parallel between the collector of the transistor 25 and that terminal of the switch 2. The decision circuitry of the present embodiment includes a plurality of NAND gates 44–48. A capacitor 32 is connected between the output of the first NAND gate 44 and the input 11 of the second NAND gate 46. The resistor 33 and the capacitor 32 together provide a voltage falling-time reference for comparing with the contact and opening time of the switch. The flashing signal generator integrated circuit 5 includes two ports for connecting to a resistive impedance which, when combining with the internal circuitry of the integrated circuit, will determine the flashing frequency of the luminous signal to be generated. Examples of such an integrate circuit which can be used as a flashing signal generator are M1320 and M1389 from Mosdesign Semi-conductor Corp. In the present preferred embodiment, the flashing rate adjustor includes a fixed resistor 31 connected in parallel with another resistor 33 which is connected in series with a switchable transistor 29 with a base resistor 49. The resistive impedance across the two flashing frequency controlling ports of the integrated circuit is controlled by varying the switching frequency of the transistor 29, thereby adjusting the overall equivalent resistive impedance across the two ports to alter the flashing frequency.

Operation of the preferred circuitry example will now be explained by reference to the circuit diagram, firstly, in the situation when the contact duration of the switch exceeds the pre-set contact time, and, secondly, the situation when the contact duration time is below the pre-set time.

Switch Contact Duration Time Exceeds a Pre-Set Time

When the switch 2 is closed, that is, when the cantilevered end of the spring member is just put into electrical contact with the other end of the switch terminal, capacitor 23 will be charged up through resistor 22 and transistor 25 will begin to conduct. At this time, input terminals 7 and 8 to the NAND gate 44 will become low because the closing of the switch 2 will connect the input terminals 7 and 8 to the low potential point of the power source 1. As a result, output terminal 9 of NAND gate 44 will become high. At this instant, capacitor 32 is being charged up and input terminals 10, 11 and 13 on the other end of capacitor 32 will be at level "1". The logic levels at the various input and output terminals are shown in row "A" of Table 1 below. It will be noted that before the switch 2 is closed, input terminals 10 and 11 to the NAND gate 46 is at the "0" (low) level because of the pull-down resistor 33. Likewise, input terminals 7 and 8 are at "1" due to connection to the high potential point of the power supply via resistor 22.

When the switch 2 has been closed for a sufficiently long time, for example, for a time exceeding a prescribed time $\tau$, capacitor 32 will have been sufficiently charged so that the voltage across its terminals will be sufficiently high. When this happens, the voltage across the resistor 33 will be low and the logic levels at input terminals 10 and 11 of NAND gate 46 and at the input terminal 13 of NAND gate 45 will be changed to the "0" (low) level. Consequently, the output level at terminal 14 of NAND gate 46 will become "1" (high). Also, output terminal 15 and input terminal 17 of NAND 47 and input terminal 20 of NAND gate 48 will be at level "0" (low), output 18 of NAND 47 and input 19 of NAND gate 48 are both "1" (high) and output 21 of NAND gate 48 is therefore at "1" (high) level.

As a result, output terminal 21 of NAND gate 48 will remain at the "1" (high) level. The various logic levels are shown in row "B" of Table 1 below. Since a flashing circuitry with a negative triggering level has been selected in the present example purely for illustration, the flashing circuit will not be actuated.

TABLE 1

| | | 7 | 8 | 9 | 10 | 11 | 12 | 13 | 14 | 15 | 16 | 17 | 18 | 19 | 20 | 21 |
|---|---|---|---|---|---|---|---|---|---|---|---|---|---|---|---|---|
| A | Initial Closing | 0 | 0 | 1 | 1 | 1 | 1 | 1 | 0 | 0 | 0 | 0 | 1 | 1 | 0 | 1 |
| B | Closed for a time longer than $\tau$ | 0 | 0 | 1 | 0 | 0 | 1 | 0 | 1 | 1 | 1 | 1 | 0 | 0 | 0 | 1 |
| C | Switch open after contact time longer than $\tau$ | 1 | 1 | 0 | 0 | 0 | 0 | 0 | 1 | 1 | 1 | 1 | 0 | 0 | 1 | 1 |
| D | Switch opened before contact time less than $\tau$ | 1 | 1 | 0 | 1 | 1 | 0 | 1 | 0 | 1 | 0 | 1 | 1 | 1 | 1 | 0 |
| E | Switch opened for time exceeding $\tau$ | 1 | 1 | 0 | 0 | 0 | 0 | 0 | 1 | 1 | 1 | 1 | 0 | 0 | 1 | 1 |

When the spring switch 2 is opened after the contact time has exceeded $\tau$, capacitor 23 will be discharged through resistors 22 and 24 and input terminals 7 and 8 of NAND gate 44 will be pulled to the high "1" level. As a result, output terminal 9 of NAND gate 44 will be at the "0" (low) level. Also, capacitor 32 will be completely discharged almost instantly through transistor 34 and resistor 33. As a result, input terminals 10 and 11 to NAND gate 46 and input 13 to NAND 45 will be at the "0" (low) level. Consequently, output terminal 15 of NAND gate 45 will be at the "1" (high) level since the input terminals 12 and 13 are both at the "0" (low) level. At the same time, output terminal 18 of NAND gate 47 becomes "0" (low) since the input terminals 16 and 17 are both high. As a result, output terminal 21 of the NAND gate 48 will be maintained at the "1" (high) level. Consequently, the negatively triggered flashing driver will not be activated when the switch is opened from the situation when the switch contact duration exceeds the pre-set time $\tau$. Again the various logic levels at the inputs and outputs of the various NAND gates when the switch is opened in this situation are shown in row "C" of Table 1.

Switch Contact Duration Below a Pre-Set Time

Turning now to a situation when the contact duration time is less than the pre-set time corresponding to a motion speed exceeding the threshold.

Referring to FIG. 2, when the switch 2 is closed, the capacitor 23 will be charged up through resistor 22 and transistor 25 will conduct. Similar to the situation above, input terminals 7 and 8 of the NAND gate 44 will be instantly pulled low and the output terminal 9 of NAND gate 44 will be at level "1" (high). Capacitor 32 will be charged up and, at this instant, input terminals 10 and 11 of NAND gate 46 as well as input terminal 13 of NAND gate 45 will also be pulled high. In this situation, the logic states of the other NAND gates 45–48 are identical to the situation when the switch is first closed as shown in row "A" of Table 1. As the output terminal 21 of NAND gate 48 is at level "1" (high), the flash driver 5 is not activated.

However, when the switch 2 is opened before a pre-set time when the capacitor 32 has been fully charged, input terminals 7 and 8 of NAND gate 44 will be instantly pulled high and the output terminal 9 will become "0" (low). At this instant, input terminals 10 and 11 of NAND gate 46 are still maintained at level "1" (high) since the capacitor 32 has not been sufficiently fully charged to pull down their voltage level. At this moment, the logic level at output terminal 15 of NAND gate 45 will become "1" (high) since input terminal 12 is now at level "0" (low). As a result, output terminal 18 of NAND gate 47 will become "1" (high) since both its two input terminals 16 and 17 are at "0" (low) level. Consequently, output terminal 21 will become at level "0" (low) and the negatively triggered flash driver 5 will be activated. The logic states of the various NAND gates are set out in row "D" of Table 1.

On the other hand, if the switch 2 is opened for a duration which is longer than the pre-set time τ, capacitor 23 will be completely discharged through resistors 22 and 24. At this moment, input terminals 7 and 8 of NAND gate 44 will be pulled to level "1" (high) and output terminal 9 of NAND gate 44 will be at level "0" (low). Also, capacitor 32 will have been completely discharged through resistor 33 and transistor 34. As a result, input terminals 10 and 11 of NAND gate 46 will be pulled low and output 14 of NAND gate 46 will become high (1). As a result, output terminal 15 of NAND gate 45 will be high since its two input terminals 12 and 13 are at low. Similarly, output terminal 18 of NAND gate 47 will become low (0) since its two input terminals 16 and 17 are both high (1). As a result, output terminal 21 of NAND gate 48 will become high and the negatively triggered flashing driver 5 will not be activated if the switch 2 is opened for duration long enough for the capacitor 32 to discharge through the resistor 33 and transistor 34 so that the voltage at the input terminals of NAND gate 46 has been pulled down to the low logic level. The logic states of the input and output terminals of the various NAND gates in this situation are set out in row "E" and are the same as the states shown in row "C" in Table 1. Hence, the signal watchdog will ensure that the circuit opening and contact closing time is less than the pre-set time in order for the flash driver to be activated to generate the luminous signal.

In this regard, it will be appreciated that the motion speed of a person wearing footwear can be estimated by the operation frequency of the contact switch and the span of each step. In turn, the frequency of operation can be calculated or estimated by the circuit closing and/or opening times which are dependent on the spring characteristics including spring length and elasticity.

Flashing Rate Adjusting Means

Turning now to the means for adjusting the flashing frequency once a threshold speed has been detected, that is, when the flashing driver has been activated. In the present embodiment, the flash driver 5 is an integrated circuit which generates a flashing signal with a flashing frequency which is dependent on the resistive impedance connected at two of its oscillator input terminals. In the present embodiment, a variable resistive impedance is provided by including a combination of a resistor 31 and a serial connection of a resistor 30 with the collector and emitter terminals of the bipolar transistor 29. It will be noted that by switching the bipolar transistor 29 on and off by supplying the switching signal to the base resistor 49 of the transistor 29, the overall effective resistive impedance across the two input terminals of the flash driver 5 can be adjusted.

The operation of the flash frequency adjustor circuitry will be further explained by reference to the circuit diagram of FIG. 2 in the situation when the contact closing and opening time is below the pre-set limit.

When the switch 2 is closed, capacitor 23 will be charged up and the transistor 25 will conduct. As a result, capacitor 28 will also be charged up through resistors 26 and 27. If the operating frequency of the contact switch is fast enough so that the capacitor 28 is always maintained at the charged rather than the discharged, state, transistor 29 will conduct and the equivalent resistive impedance across the flash driver's oscillator port will be varied. As a result, the flashing frequency of the flash driver 5 will be adjusted. Of course, if the operating frequency of the contact switch is up high enough to maintain the capacitor 28 at a charged state, transistor 29 will not be turned on and the effective resistive impedance across the oscillator port of the flashing generator will not be adjusted.

Figure 3:
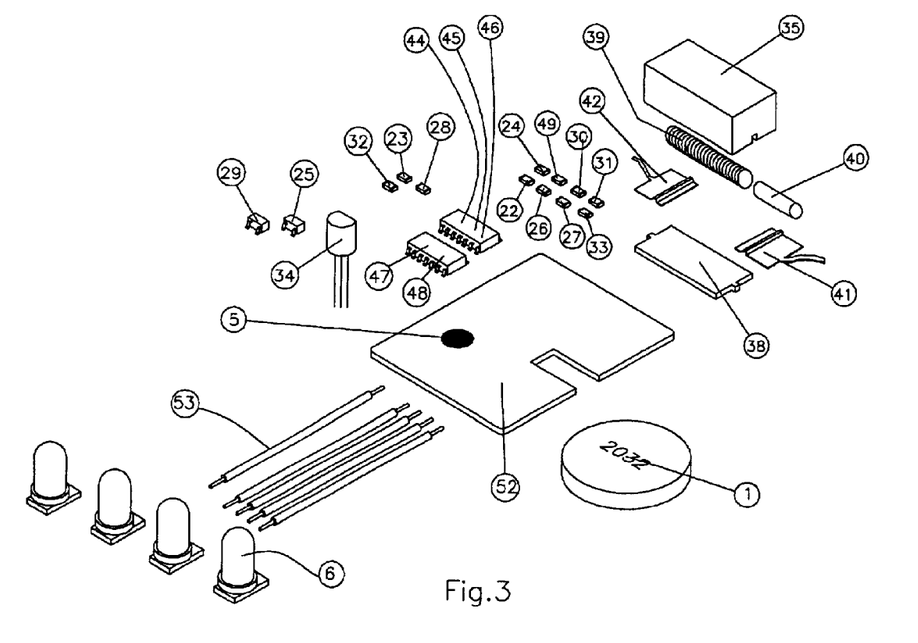
FIG. 3 is an exposed diagram showing the components for implementing the circuit arrangement of FIG. 2.
Figure 4:
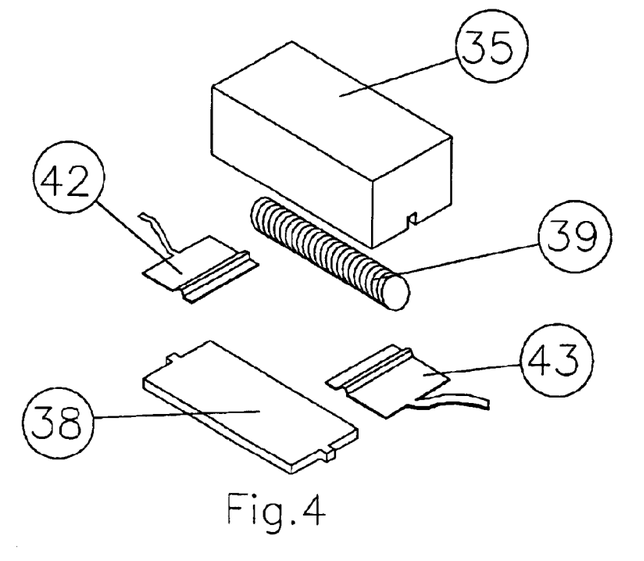
FIG. 4 is an enlarged view showing the components of the motion activated spring contact switch.
Figure 5:
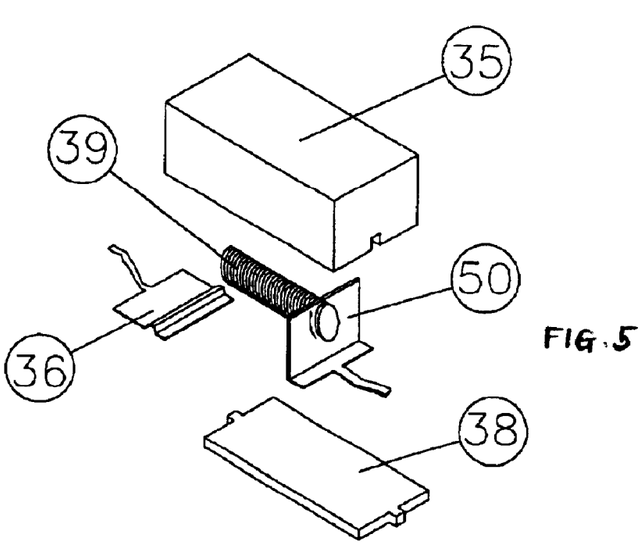
FIG. 5 is a diagram showing alternative components for assembling the motion activated contact switch.

Turning now to the preferred embodiments of the contact switch. Referring to FIGS. 3 and 4, the motion activated switch includes a housing 35, a bottom cover 38, metal plates 41, 42 as the two terminals of the switch, a coil spring 39 and a metal rod 40. The metal rod 40 is inserted into the coil spring 39 to increase the sensitivity of the motion switch. In this preferred embodiment of the motion switch, one end of the cantilevered spring is retained by compressive force on one terminal and no soldering is required to avoid possible contamination by soldering flux. As a result, the sensitivity and conductivity of the motion actuated switch can be well maintained. In the present embodiment, the coil spring actuation member 39 is placed in the closed circuit connection so that both its fixed and the cantilevered ends are in contact with the terminals of the switch and the switch is at the closed circuit condition. When the motion switch is subject to an external motion force, the cantilevered end of the coil spring 39 will move away from one of the contact terminals, thereby forming an open circuit. Furthermore, to safeguard good contact and sensitivity of the contact surfaces, it is preferred that the contact surfaces are applied with a thin layer of silicon oil so that sparks which may occur during each transient circuit contact may be avoided or alleviated to prolong the operating life of the motion actuated contact switch.

Furthermore, it will be appreciated that when flashing drivers having increased lighting outputs are available, the present invention can be adapted to provide increased number of lighting outputs. Preferably, a plurality of lighting elements are distributed at the front of shoe surface so that the speed indicative luminous signals can be observed by the wearer as well as other third parties.

Figure 6:
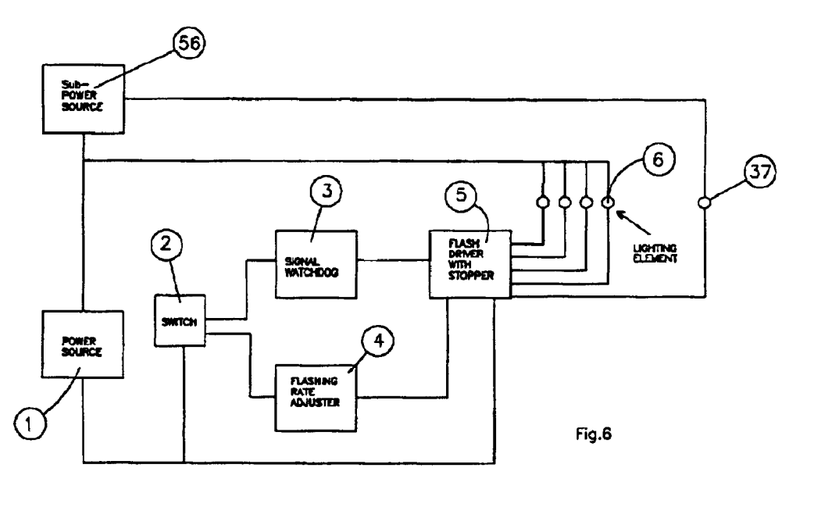
FIG. 6 is a block diagram showing another preferred embodiment of the present invention.

Referring to FIG. 6 in which there is shown a further embodiment of the present invention, it will be appreciated that an additional power supply 56 is provided so that other luminescent elements such as high voltage driven blue and white LEDs can also be utilized in lighted footwear.

While the present invention has been explained by reference to the preferred embodiments described above, it will be appreciated that the embodiments are only examples provided to illustrate the present invention and are not meant to be restrictive on the scope and spirit of the present invention. In particular, the invention and the circuits of the preferred embodiments can be utilized in foot-driven toys such as skateboards, rollers etc. as well as footwear. The scope of this invention should be determined from the general principles and spirit of the invention as described above. In particular, variations or modifications which are obvious or trivial to persons skilled in the art, as well as improvements made on the basis of the present invention, should be considered as falling within the scope and boundary of the present invention. Furthermore, while the present invention has been explained by reference to the specific circuit arrangements with NAND gates, it should be appreciated that the invention can be implemented using other circuit components.

What is claimed is:

1. A luminous circuit arrangement for footwear and foot-driven toys, including:
    a motion actuated contact switch,
    a speed threshold detector that detects whether a received motion signal represents a motion with a speed reaching a predetermined threshold, and
    a luminous signal generator, wherein
        said motion actuated contact switch includes a contact switching member having an instantaneous contact switching frequency which correlates to the speed of the actuating motion,
        said speed threshold detector includes means to compare the switching speed of said contact switch with a pre-determined speed, and
        said threshold detector provides a signal to said luminous signal generator when the switching speed of said contact switch reaches said pre-determined speed.

2. A luminous circuit arrangement according to claim 1, wherein said speed threshold detector includes timing and decision circuitry for determining whether the operating speed of said motion actuated speed has reached said pre-determined speed by comparing the contact duration time of said contact switch during circuit closing with a pre-set time.

3. A circuit arrangement according to claim 2, Wherein said pre-set time being equivalent to the switch closing time duration in each switch operation cycle corresponding to the switch closing duration at said pre-determined threshold speed.

4. A circuit arrangement according to claim 3, wherein said timing circuitry includes a resistor capacitor (R-C) pair having a time constant approximately equal to said pre-set time.

5. A circuit arrangement according to claim 2, wherein said timing circuitry includes a resistor (R) and a capacitor (C) such that the time constant (c=RC) is approximately equal to the contact time per operation cycle of said motion actuated contact switch corresponding to said pre-determined speed.

6. A circuit arrangement according to claim 2, wherein said operating speed of said contact switch is determined by monitoring the contact duration time during each switch closing cycle.

7. A circuit arrangement according to claim 2, wherein said speed threshold detector includes timing and decision circuitry for determining whether the operating speed of said motion actuated speed has reached said pre-determined speed by comparing duration during which the switch is opened during an operation cycle.

8. A circuit arrangement according to claim 1, wherein said motion actuated contact switch includes a cantilevered spring actuation member having a springable free end which closes or opens said switch connection respectively by contacting with or disengaging from a switch terminal of said switch, said contact duration time between said spring end and said switch terminal being inversely proportional to said speed of operation of said contact switch.

9. A circuit arrangement according to claim 1, wherein said luminous signal generator further includes a flashing frequency controller such that the flashing frequency of said luminous signal generator is varied by the operating frequency of said contact switch.

10. A circuit arrangement according to claim 1, wherein said luminous signal generator further includes a flashing frequency controller in which the flashing frequency output is variable by the resistance value at the input of said controller, said resistance being variable by said contact duration of said contact switch.

11. A circuit arrangement according to claim 10, wherein the inputs of said first NAND gate are connected to the terminal of said motion activated switch which terminal is connected to the high potential side of said power supply.

12. A circuit arrangement according to claim 1, wherein said speed threshold detector includes first and second NAND gates, a capacitor connecting between the output of the first NAND gate and the inputs of said second NAND gate, and a resistor connecting between the inputs of said second NAND gate and the low-potential side of the power supply.

* * * * *